3,205,534
DEVICE FOR PRODUCING HOLLOW BODIES FROM THERMOPLASTIC SYNTHETIC MATERIAL
Erhard Langecker, 32 Oststrasse, Meinerzhagen, Germany
Filed Jan. 15, 1962, Ser. No. 166,143
Claims priority, application Germany, Mar. 24, 1961,
B 61,842
3 Claims. (Cl. 18—14)

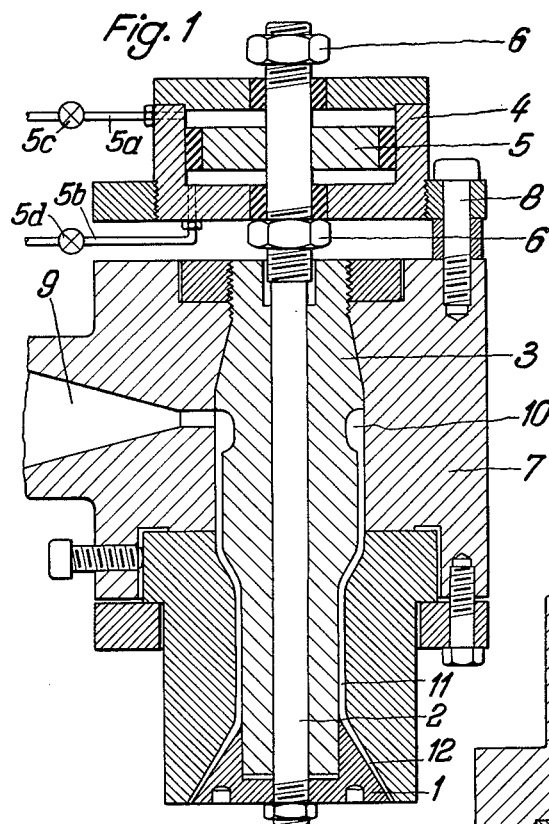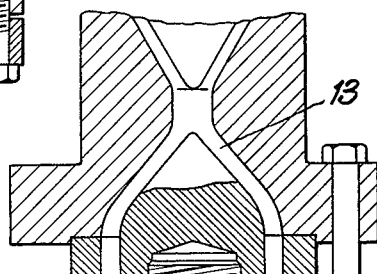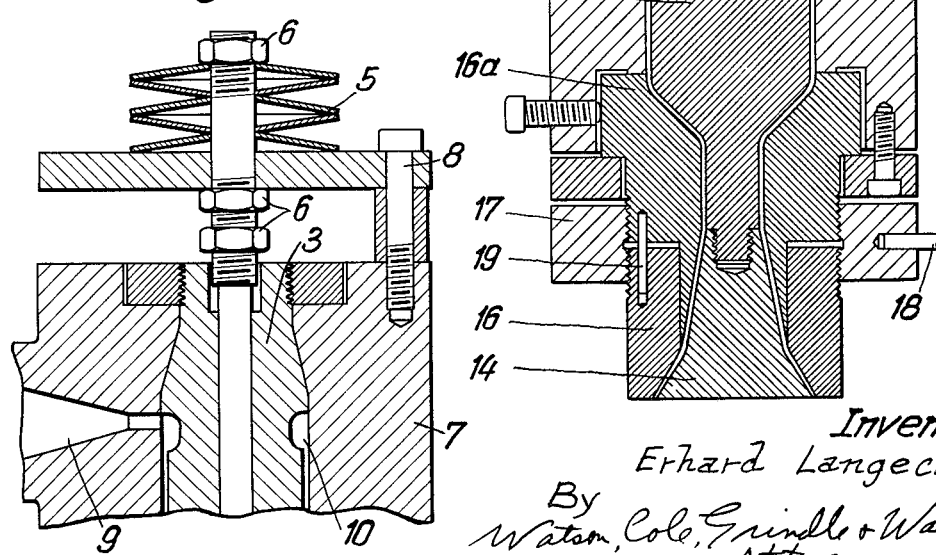

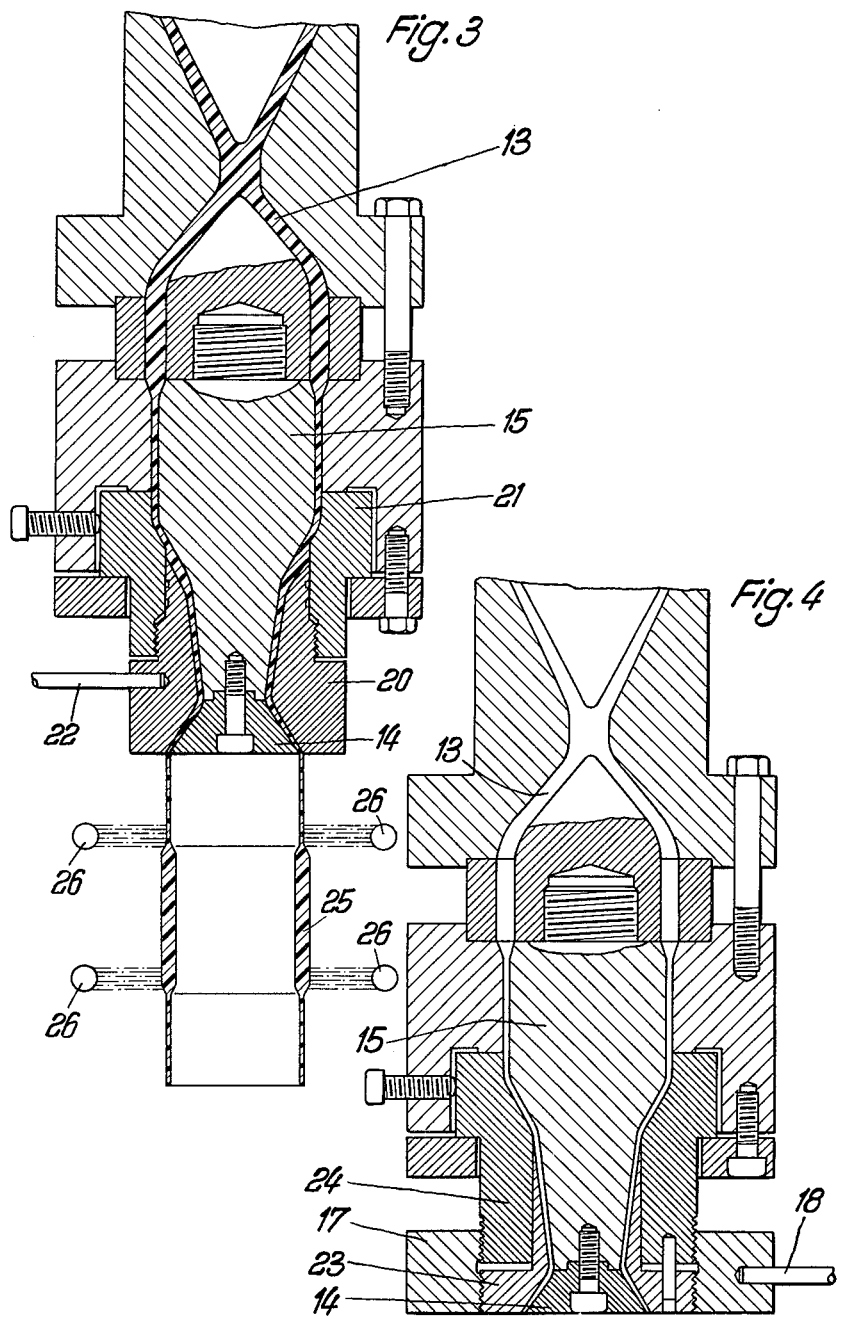

The invention relates to a device, namely an extrusion nozzle, for extruding hollow bodies from thermoplastic synthetic material with a nozzle core adjustable in relation to the nozzle sleeve, the head of which core is made conical and which forms, together with a correspondingly shaped surface of the nozzle sleeve, an adjustable outlet orifice.

The device according to the invention differs from known devices in that the outlet orifice can be automatically increased or decreased during the extrusion of the hose at desired positions along its length at which it is intended to vary its thickness according to the length of hose extrusion. This makes it possible to produce a hollow body, e.g. a bottle, which is thick at the bottom, thin in the body and thicker again at the neck or vice versa, thin at the base and neck and thick in the body, or may have repeated thick and thin places.

The automatic control of the nozzle orifice is effected in dependence on the extruded hose length, e.g. by photo cells which are arranged at corresponding distances from one another below the extrusion nozzle and are covered from the hose as soon as this has reached the appropriate length at which the thickness of the hose is to be altered, and thereby release the means effecting the alteration of the outlet orifice.

In machines in which the material required for a length of hose is fed by pistons or by axially displaceable extruding worms, the adjustment of the nozzle orifice can be effected during the extrusion either by a corresponding alteration of the path of the piston or by the displacement of the worm directly, or via by having photocells actuated by the respective position of the piston or worm instead of the position of the extruded hose itself. The piston or movable worm can also, e.g. by means of a plurality of cams whose spacing corresponds to the spacing of the intended hose thickenings, actuate working and rest position contacts, which further actuate magnetically controlled valves which engage or disengage mechanical means e.g. a hydraulic or compressed air cylinder adapted to adjust the nozzle orifice correspondingly.

Finally other kinds of control are possible as desired. For example use of a control roller or of several control lugs, which control the whole working cycle of the machine, but always in such a way that the adjustment of the nozzle orifice is effected in dependence on the length of the hose. It is also possible to use for the adjustment an hydraulic motor, or springs, while during the extrusion process the damming pressure, i.e. the resistance against the discharge of the material, is varied which is to be balanced by the spring pressure. With a high damming pressure the nozzle orifice is increased in spite of the spring force while with low damming pressure it is diminished by the spring force.

When hitherto a nozzle was used having an extrusion orifice tapering towards the discharge end was used, the disadvantage arose that the material changed having its diameter decreased in the extrusion head changes again in diameter shortly after emerging from the nozzle, but this disadvantage does not arise when the head has a cone widening towards the discharge end. By such a construction of the nozzle head it can in fact be obtained that the material again runs cylindrically after leaving the nozzle, but it is however necessary in this connection that the conical head widening towards the outlet has a surface diverging at an angle selected in accordance with the material used, to be determined for the various thermoplastic raw materials by tests, so that the diameter of the extruded hose remains the same as the outlet cross section of the nozzle. For low pressure polyethylene for example this angle is about 45°.

It has also been already suggested to displace the nozzle core relatively to the nozzle sleeve by any reliable mechanical, pneumatic, and electric means and to form the exit channel between the core and sleeve partly conical. In the known embodiments of such constructions the end part of the nozzle orifice was always formed cylindrical, whereby the disadvantage arose that, when displacing the core from the initial position in which the end surface of the nozzle sleeve and of the nozzle core are aligned, either inwardly, i.e. with retracted nozzle core, the extruded thermoplastic mass formed first an accumulation before the nozzle core and the extruded hose piece was closed at its upper end, or outwardly i.e. with projecting nozzle cone, the hose was not extruded cylindrically with the same inner diameter as the exit ending of the orifice, but was vaulted outwardly at the exit of the orifice during its extrusion. The reason therefore was, that with this embodiment the exit cross section proper remains unchanged and only the working pressure, i.e. the pressure with which the material is extruded, changes due to the conical form of the nozzle core and nozzle sleeve. Therefore, it was impossible to begin the extruding process at any reliable position of the nozzle core relatively to the nozzle sleeve, but at the beginning of the extrusion process the nozzle core must be so adjusted that its lower surface was in the same plane with the lower surface of the nozzle sleeve, and it was necessary to begin with the thinnest width of the wall of the extruded hose.

The invention removes this disadvantage thereby that the conical part of the extrusion channel is provided at the outer end of said channel so that extrusion could be started at any position of the nozzle core and the nozzle sleeve by displacing these parts relatively to each other.

The hose is drawn off initially at a higher speed than the discharge speed of the hose and when the decreasing draw-off speed gradually decreases while the discharging speed remains the same height the cross-section of the hose increases, so that a hollow body manufactured from such hose is obtained with increasing wall thickness or cross-section. It is however absolutely necessary that the hose is seized and drawn off near the nozzle outlet. It is not possible with this process to vary the cross-section of the hose repeatedly or to make the cross-section first thick and then thin, as the hose is uniformly stretched over the whole length emerging.

Another possibility of adjusting the nozzle orifice is an adjustment of the nozzle sleeve relatively to a fixed nozzle core, in which connection the nozzle sleeve is made in two parts, the upper part fixed and the lower part, which has the hollow cone, displaceable in respect of the upper one. Both parts can be connected e.g. by means of a screw thread, so that by rotating the lower part an axial displacement and hence an adjustment of the discharge orifice is obtained.

In order to avoid a rotation of the two parts in relation to one another at each displacement, the two parts of the nozzle sleeve are guided against one another by a guide means, e.g. by pins, and are provided on the outside with right hand and left hand threads, so that they can be moved towards one another or away from one another by a nut placed on them having right hand and left hand threads.

The rotation of the lower nozzle part or the rotation of the nut provided with right hand and left hand threads may be effected in various ways; for example by a worm drive in which connection the worm spindle is rotated by a motor or by an hydraulic or compressed air cylinder, which engages two levers which are fixed to the fixed or rotatable part.

By way of example several embodiments of adjustment will now be described with reference to the accompanying drawings in which:

FIGURE 1 shows an angular extrusion head, in which the adjustment of the core head is effected by an hydraulic cylinder, FIGURE 1a is a part of FIG. 1, in which however the adjustment of the core head is made by a packet of springs, FIGURE 2 shows an axial extrusion head in which the adjustment of the nozzle halves is effected by a ring provided with right hand thread and left hand thread, FIGURE 3 shows an embodiment in which the lower nozzle part is directly connected with the upper nozzle part by means of screw threads and is adjusted by rotation in the axial direction, and FIGURE 4 shows a form of embodiment, in which the division of the nozzle sleeve is varied by comparison with the embodiment in FIGURE 2 inasmuch as the lower part of the nozzle is guided in the upper part.

In FIGURE 1 the conical portion provided on the nozzle core 3 is designated by 1. This conical part is applied on a rod 2 which passes through a bore of the nozzle core and whose upper end passes through an hydraulic cylinder 4, whose piston 5 is mounted rigidly on the rod. The rod carries adjustable nuts 6, which act as stops for restricting the stroke. The cylinder is fixed to the sleeve 7 on the extruder by screws 8.

The feed of the thermoplastic material is effected through an inlet 9 extending in the transverse direction, which opens into a recess 10 on the nozzle core. From the latter a channel 11 extends to the nozzle head 1.

By feeding an hydraulic liquid to either side of the piston 5 by means of a pipe 5a or 5b provided with a valve 5c or 5d respectively the rod 2, and with it the core 1, is raised or lowered and thereby the discharge orifice 12 increased or diminished.

The point of the conical head is directed inwards, so that the material entering the discharge orifice 12 through the channel 11 is released by the increasing cross-section with simultaneous decrease in the groove. The extruded hose is in this way completely cylindrical with an internal diameter which substantially corresponds to the maximum diameter of the conical portion of the core.

Instead of the hydraulic motor it is also possible to use a packet of springs 5a (FIG. 1a), whose tension is controlled by the damming pressure, i.e. when the damming pressure rises the nozzle orifice increases in spite of the spring pressure, and with decreased damming pressure again diminishes.

The alteration of the damming pressure is made in a known manner by causing, with machines having a feeding worm, the worm to rotate quicker or slower respectively, and with machines having a feeding piston, to throttle the stream of the plastified mass correspondingly by a valve controlling said stream.

In the form of embodiment in FIGURE 2 an axial hose head is compressed, to which the material is fed through ducts 13. The nozzle core is made in two parts, the lower part 14 having its lower end formed like a cone widening downwards and being fixed to the upper part 15 e.g. by screwing. The nozzle sleeve is in two parts, the said two parts 16 and 16a being held together by being provided on the sides turned towards one another with right hand or left hand male threads, on which a ring 17, provided with right hand and left hand threads, is placed. The ring can be rotated by means of a lever 18 and thereby the two parts are brought nearer to one another or removed from one another. A pin 19 prevents a rotation of the lower part 16 in relation to the upper part 16a during adjustment.

FIGURE 3 corresponds essentially to FIGURE 2, but here the adjustment of the two parts 20 and 21 of the nozzle sleeve is effected in that the part 20 is screwed into the part 21. It carries a lever 22 by which it is rotated and in this way can be adjusted vertically, in order to adjust the outlet orifice.

Those parts, in so far as they correspond, are provided with the same reference numeral.

Finally, FIGURE 4 shows another form of embodiment substantially corresponding to FIGURE 2, but here the division of the nozzle liner is effected in that the lower part 23 leads to the inside of the upper part of 24. Both parts have likewise on the outside right hand or left hand threads and can be adjusted by the ring 17 by means of the lever 18.

All the forms of embodiment described for the adjustment, give good results, whether smaller or larger discharge orifice diameters are designed to be used.

The embodiment in FIGURE 4 is particularly valuable for large nozzle diameters, while the embodiment in FIGURE 3 is better for smaller discharge diameters.

The automatic control according to the invention is effected in all the embodiments of the nozzle by control means known per se, preferably by photocells 26 (FIG. 3), which are arranged alongside the hose 25 being extruded at those places below the extrusion nozzle where the hose when it has reached this spot is supposed to undergo a variation in thickness. The hose then covers the photocell so that this releases electric impulse. The impulse serves to produce in a known manner, e.g. as described and illustrated in FIG. 2 and the appertaining part of the specification of the United States Patent No. 3,019,481 an adjustment of the orifice during the extrusion of the hose, in dependence on the length of hose extruded in order to adjust the increase or decrease, respectively, of the quantity of material to be extruded.

In machines in which the material required for a length of hose is fed by the stroke of a piston, the adjustment of the nozzle orifice can be effected during the extrusion also in dependence on the travel of the piston, or in machines with axially displaceable extruding worms in dependence on the movement of the worm, in which case the piston or movable worm actuate contacts, e.g. by several cams whose distance corresponds to the relationship of the distance of the hose thickenings which contacts further actuate magnetically controlled valves for example which adjust the nozzle orifice by means of an hydraulic or compressed air cylinder. By this means again hollow bodies with cross-section varying in length may be produced.

In the embodiment in FIGURE 1 in this connection the feed of the hydraulic liquid above or below the piston 5 is quantitatively controlled by valves 5c, 5d which are turned on or off by the current surges produced by the photocells 26, and in the other forms of embodiment the lever 18 or 22 is rotated by the current surges via magnetically controlled valves which actuate pneumatic or hydraulic cylinders. Of course the adjustment can also be effected by other means, e.g. by control rollers, adjustable time switches or the like. As such methods of control are widely known, e.g. by FIG. 1 of my prior United States Patent 2,978,745, no special illustration is required.

I claim:

1. A hose nozzle for producing hollow bodies from thermoplastic synthetic material through an adjustable cone-shaped nozzle core relative to a nozzle sleeve comprising a head member for the nozzle core and the nozzle sleeve having a cone shape corresponding to the cone shape of the core to form an adjustable outlet gap therebetween to produce a changeable wall thickness and means to adjust the nozzle core relative to the nozzle sleeve, means for sensing the length of hose, and control means acting on said adjusting means to adjust the relative position of the nozzle core and nozzle sleeve in response to said sensing means, said outlet gap formed by the surfaces of the core and the sleeve from the exit end increasing in size so that the gap is adjusted dependent on the pressed out length of the hose as influenced by an impulse control which is regulatable.

2. A device as claimed in claim 1, in which said impulse control comprises photocells, which are arranged at corresponding distances of each other below the hose nozzle, said photocells being covered by the hose as soon as the latter has reached the length, at which the thickness of the hose is to be altered, thereby releasing an impulse to actuate the impulse control causing the variation of the outlet orifice.

3. A device as claimed in claim 1, wherein the nozzle core is fixed and the nozzle sleeve is composed of two parts as a fixed upper part and a lower part which has the hollow conical end and is movable in relation to the upper part by connection therewith by means of right hand and left hand threads, and a nut provided with right hand and left hand threads applied on the parts so that the two parts are movable towards or away from one another.

References Cited by the Examiner
UNITED STATES PATENTS

| | | | |
|---|---|---|---|
| 2,349,178 | 5/44 | Kopitke | 18—5 |
| 2,379,956 | 7/45 | Ersepke | 18—14 |
| 2,632,202 | 3/53 | Haines | 18—5 |
| 2,750,625 | 6/56 | Colombo | 18—5 |
| 2,780,835 | 2/57 | Sherman | 18—14 |
| 2,854,691 | 10/58 | Strong | 18—5 |
| 3,002,615 | 10/61 | Lemelson | 18—2 |
| 3,019,481 | 2/62 | Negoro | 18—5 |
| 3,029,471 | 4/62 | Adams et al. | 18—5 |
| 3,032,810 | 5/62 | Soubier | 18—5 |

FOREIGN PATENTS 1,025,834   1/53   France.

WILLIAM J. STEPHENSON, *Primary Examiner.*
MICHAEL V. BRINDISI, ROBERT F. WHITE,
*Examiners.*